(12) United States Patent
Aldrin (10) Patent No.: US 9,917,745 B2
(45) Date of Patent: Mar. 13, 2018

(54) VALIDATION OF CHAINED NETWORK SERVICES

(71) Applicant: Futurewei Technologies, Inc., Plano, TX (US)

(72) Inventor: Sam K. Aldrin, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 23 days.

(21) Appl. No.: 14/497,530

(22) Filed: Sep. 26, 2014

(65) Prior Publication Data

US 2015/0092564 A1    Apr. 2, 2015

Related U.S. Application Data

(60) Provisional application No. 61/883,258, filed on Sep. 27, 2013.

(51) Int. Cl.
 *H04L 12/24* (2006.01)

(52) U.S. Cl.
 CPC ................. *H04L 41/5038* (2013.01)

(58) Field of Classification Search
 CPC .................................................. H04L 41/5038
 See application file for complete search history.

(56) References Cited

U.S. PATENT DOCUMENTS

| | | | | |
|---|---|---|---|---|
| 9,077,556 B2* | 7/2015 | Fan | ..................... | H04L 12/2859 |
| 2009/0037713 A1* | 2/2009 | Khalid | ................ | H04L 12/4633 |
| | | | | 713/1 |
| 2011/0194403 A1* | 8/2011 | Sajassi | ................... | H04L 12/462 |
| | | | | 370/217 |
| 2013/0163594 A1* | 6/2013 | Sharma | .................. | H04L 45/64 |
| | | | | 370/392 |
| 2015/0229550 A1* | 8/2015 | Addeo | .................... | H04L 43/10 |
| | | | | 709/224 |

OTHER PUBLICATIONS

Aldrin, et al., "Service Function Chaining Operations, Administration and Maintenance Framework," draft-aldrin-sfc-oam-framework-00, Jul. 2, 2014, 11 pages.
Quinn, Ed., et al., "Service Function Chaining Problem Statement," draft-ietf-sfc-problem-statement-07.txt, Jun. 24, 2014, 19 pages.
Bradner, "Key Words for Use in RFCs to Indicate Requirement Levels," RFC 2119, Mar. 1997, 3 pages.
Andersson, et al., "Guidelines for the Use of the "OAM" Acronym in the IETF," RFC 6291, Jun. 2011, 9 pages.
Kompella, et al., "Detecting Multi-Protocol Label Switched (MPLS) Data Plane Failures," RFC 4379, Feb. 2016, 50 pages.
Salam, et al., "Transparent Interconnection of Lots of Links (TRILL) Operations, Administration, and Maintenance (OAM) Framework," RFC 7174, May 2014, 33 pages.

* cited by examiner

*Primary Examiner* — Yemane Mesfin
*Assistant Examiner* — Henry Baron
(74) *Attorney, Agent, or Firm* — Conley Rose, P.C.

(57) ABSTRACT

A method implemented in a network element, the method comprising identifying a first service function (SF) for validation, the first SF being associated with a service function chain (SFC), being applied to a data flow, and operating on a first network node, encoding one or more tests associated with the first SF in an operations, administration, and management (OAM) packet, and transmitting a validation request comprising the OAM packet towards the first SF to request validation of the first SF by execution of the tests.

17 Claims, 9 Drawing Sheets

VALIDATION OF CHAINED NETWORK SERVICES

CROSS-REFERENCE TO RELATED APPLICATIONS

The present application claims priority to U.S. Provisional Patent Application 61/883,258 filed Sep. 27, 2013 by Sam K. Aldrin and entitled "Validation of Chained Network Service Functions," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many networks employ network functions that are manually configured on network elements (NEs) operating in the network. Such configuration involves allocation of NE physical resources to enable the functions. The development of virtualization and constant development of new services has resulted in increasing demand on network administrators, resulting in a desire to configure and manage various services programmatically. In some cases, such some services may depend on one another. With large scale services being deployed and customized on a per customer or an as need basis, such service dependences may become quite complex. Enabling new services on an existing network is a complex task and may require a complete re-design of a network in order to create a workflow of dependent services that incorporates a new service function. Further, there is not an effective mechanism for determining whether such dependent services are operating together as intended in a new deployment beyond basic trial and error of each function.

SUMMARY

In one embodiment, the disclosure includes a method implemented in a network element, the method comprising determining to validate a first service function (SF) associated with a service function chain (SFC) that is applied to a data flow, wherein the first SF operates on a first network node, encoding one or more tests associated with the first SF in an operations, administration, and management (OAM) packet, and transmitting a validation request comprising the OAM packet towards the first SF to request validation of the first SF by execution of the tests.

In another embodiment, the disclosure includes a network node comprising a transmitter, a receiver, and a processor coupled to the transmitter and the receiver and configured to cause the network node to execute a local service function associated with a service function chain, wherein executing the local service function comprises performing an operation on all messages associated with a data flow, receive, via the receiver, a validation request comprising an OAM packet that requests validation of a plurality of service functions associated with the service function chain, wherein the OAM packet comprises a plurality of tests, execute the local service function on each valid test directed to the local service function, and populate a validation response with results associated each test directed to the local service function.

In another embodiment, the disclosure includes a method comprising encapsulating an OAM message with a SFC header for testing a SFC component, wherein the SFC component comprises an ordered set of service functions that provide a specific service for a network, and transmitting the OAM message toward a network element implementing at least a portion of the SFC component to validate a policy or a functionality of the SFC component.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A plurality of dependent, ordered, and/or interrelated service functions are referred to herein as an SFC. Some SFs in a SFC operate on different layers of the Open Systems Interconnect (OSI) model. As such, per layer OAM mechanisms are unsuitable for testing an entire SFC's functionality. For example, SFs such as a firewall, Deep Packet Inspection (DPI), policy configurations, and load balancing may be chained together to create a SFC, but an OAM mechanism designed to test a DPI SF is not capable of verifying/validating the other network SFs in the SFC.

Disclosed herein is an OAM based mechanism to support verification/validation of a particular SF in a SFC, a plurality of SFs in a SFC, and/or an entire SFC. An example framework for OAM validation for SFs/SFCs as discussed herein is further disclosed in Internet Engineering Task Force (IETF) document draft-aldrin-sfc-oam-framework-00, which is incorporated by reference as if reproduced in its entirety. By employing the mechanisms discussed herein, SFs can be validated despite being hosted on a single device or a plurality of devices. The SFs may be validated sequentially or non-sequentially. The mechanisms discussed herein may validate the SFs/SFCs on demand or continuously. In various embodiments, validation can be requested by an initiator inside the network, from a remote initiator via a proxy, and/or a validation results aggregator. An OAM packet is loaded with test requests for specific SFs and associated test cases. The OAM packet is then forwarded through the SFC in a manner similar to a data packet. The relevant SFs in the SFC process the test cases and report the results upon receipt of the OAM packet. As some of the SFs operate on a common NE in some embodiments, an internet protocol (IP) address or a media access control (MAC) address does not uniquely identify each SF in all cases. In an embodiment, SF identification is performed by employing a time to live (TTL) mechanism. In such an embodiment, the OAM packet is encoded with an overlay header that comprises a overlay TTL set to a number of network hops to an ingress SF in the SFC. The OAM packet is further encoded with a network service header that comprises a service TTL set to a SF hop count to a particular SF in the SFC. Each SF refreshes the overlay TTL to cause the next SF to process the OAM packet. Each SF further checks the service TTL when processing the OAM packet. When the service TTL is not zero, the SF determines that the associated test(s)/test cases are for a different SF and decrements the service TTL. When the service TTL is zero, the SF performs the test(s)/test cases and resets the service TTL to a SF hop count associated with the next SF to be tested or to the originator of the request, for example by extracting the relevant data from the OAM packet payload. In another embodiment, SF identification is performed by encoding metadata and/or a SF signature in an OAM packet payload. The metadata/signature is added to an OAM packet by a sender and used by a receiver to parse the OAM packet and forward the packet to the proper SFs in the SFC.

Figure 1:
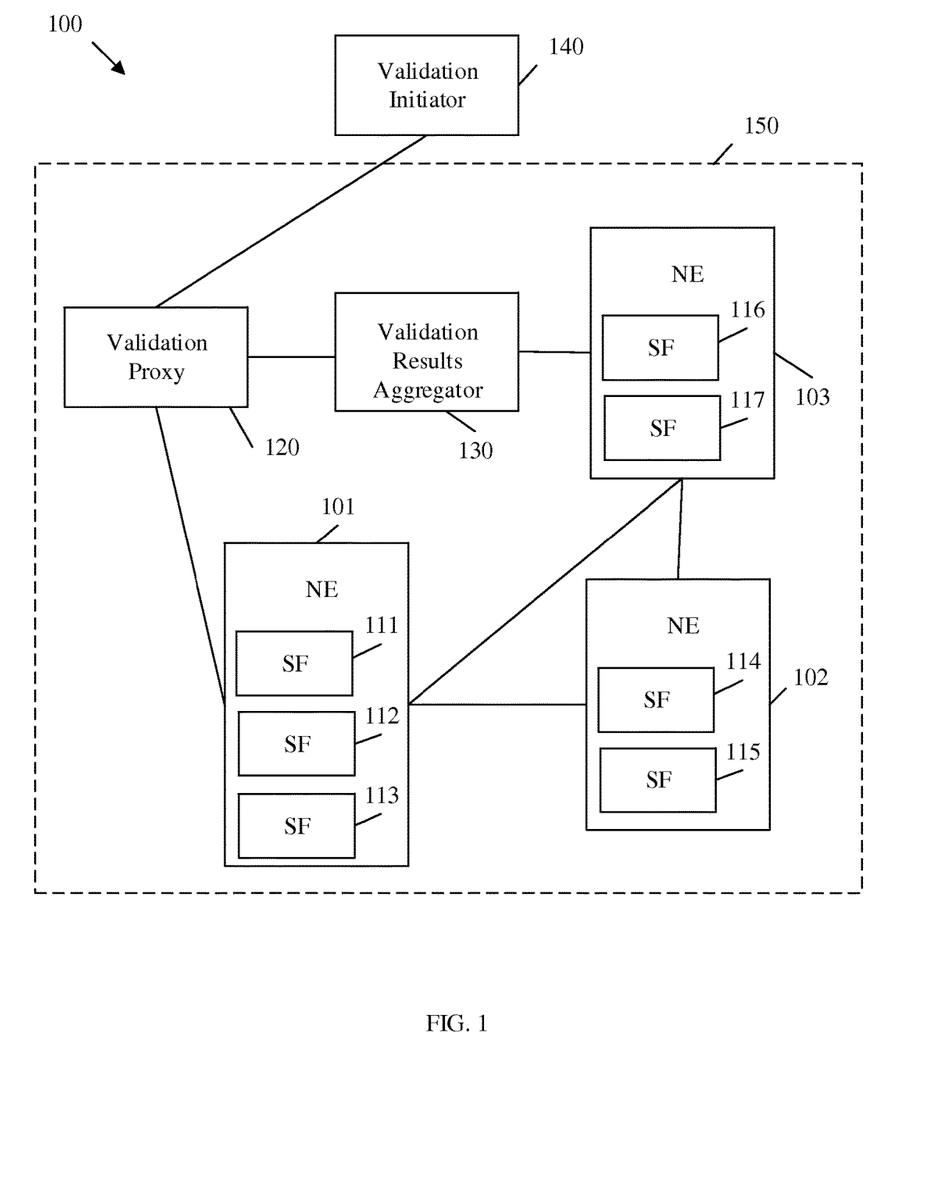
FIG. 1 is a schematic diagram of an embodiment of a network configured to support validation of service functions and/or associated service function chains.

FIG. 1 is a schematic diagram of an embodiment of a network 100 configured to support validation of SFs and/or associated SFCs. Network 100 comprises a validation initiator 140, a validation proxy 120, a validation results aggregator 130, a network domain 150 and NEs 101, 102 and 103. NE 101 implements SFs 111, 112, and 113. NE 102 implements SFs 114 and 115. NE 103 implements SFs 116 and 117. SFs 111-117 are part of a common SFC. Validation initiator 140 sends a SF and/or SFC validation request to the network domain 150. The validation request may be an OAM packet. Validation proxy 120 proxies the request and forwards the request to NEs 101-103 for processing by SFs 111-117. Results of the validation request are aggregated by validation results aggregator 130 and forwarded to the validation initiator 140 via validation proxy 120.

A validation initiator 140 is any network element configured to request validation/verification of a SF, a plurality of SFs, and/or an SFC. For example, the validation initiator 140 may be a head end node for a network path, a network management system (NMS) associated with network domain 150, and/or a node in a remote network configured to act as a destination for an associated data flow. A data flow is an associated group of data transmissions (e.g. packets) traversing a network, for example as part of a session. While FIG. 1 depicts validation initiator 140 outside of the network domain 150, the validation initiator 140 may be located inside the network domain 150 in some embodiments. The validation initiator 140 is configured to initiate testing of an SF and/or SFC by preparing an OAM packet. The OAM packet is encoded to include one or more tests and/or test cases for a specified SF, a plurality of SFs, and/or all SFs in an SFC. The validation initiator 140 obtains test data to support the various tests from a data base (e.g. in the control plane) and/or from a system administrator. The validation initiator 140 may be configured to request validation continuously or in response to a specified event. The validation initiator 140 employs the OAM packet to test SFs sequentially and/or non-sequentially and also forwards a trigger with test data to cause the SFs to be tested in response to the occurrence of an event. It should be noted that the terms validation and verification both refer to determining that a specified item is functioning correctly. Accordingly, the terms validate and verify may be used interchangeably herein unless otherwise specified.

A validation proxy 120 is any device configured to proxy the validation initiator 140. For example, the validation proxy 120 is configured to act as an intermediary for the validation initiator 140 in domain 150. The validation proxy 120 receives packets from validation initiator 140, converts such packets as needed to interact with nodes in domain 150, and forward such packets. A packet sent from proxy 120 into network domain 150 indicates that proxy 120 is the source of the packet. Nodes in network domain 150 treat the proxy 120 as the packet source and return responses to proxy 120 as if the proxy was the source of the packet. The proxy 120 then returns received responses to the validation initiator 140. The proxy 120 allows the validation initiator 140 to interact with nodes of network domain 150 as if the validation initiator was positioned in network domain 150. As such, proxy 120 may be omitted from embodiments where the validation initiator 140 is positioned in the network domain 150.

NEs 101-103 are any network nodes configured to implement SFs (e.g. SFs 111-117) and/or a SFC. It should be noted that three NEs are depicted for clarity of discussion. However, an entire SFC may be implemented on a single NE, varying numbers of NEs may be employed to implement a plurality of SFs, and/or a specified SF may be implemented over a plurality of NEs. NEs 101-103 may be similar or different devices and may be each selected based on the SFs that are intended to operate on the NE. For example, NEs 101-103 may be switches, routers, servers, data storage units, bridges, clients, security nodes, network controllers, and/or any other network device suitable to implement an associated SF. It should also be noted that seven SFs are depicted for clarity of discussion. However, a SFC may comprise any number of SFs needed to implement a particular policy on a data flow. Further, multiple SFCs with varying numbers of SFs may operate simultaneously on a network such as network 100 to manage a plurality of data flows for a plurality of customers, sources, destinations, etc. For example, SFs 111-117 may comprise a classifier function configured to map data flows to a particular SFC, a DPI function configured to perform packet filtering, a traffic engineering (TE) function configured to maintain awareness of network topology and/or network traffic conditions and perform network routing (and/or wavelength assignment in optical networks), a firewall and/or other security function, and/or any function configured to implement all or a portion of a network policy to data traffic generally, to an identified data flow, and/or to a group of data flows. It should be noted that SFs 111-117 may include functions applicable to any network, functions specific to a particular network type, functions specific to a particular type of communication, and/or functions customized for a particular customer. Further, SFs may operate on multiple layers of the OSI model, such that some SFs in an SFC are completely unaware of other SF in the same SFC. As such, SFs such as SFs 111-117 may interact in a complex and a sometimes unintended manner. The SF/SFC validation/verification mechanisms discussed herein allow a network node and/or a system administrator to determine whether SFs 111-117 are performing and/or interacting as intended (e.g. to enforce a specified system policy). In the case where one or more of SFs 111-117 are not functioning properly, the mechanism herein supports identifying the source of such error so that other OAM functions and/or a system operator are equipped to take corrective action.

Validation results aggregator 130 is any network device configured to receive results of SF/SFC related tests and aggregate such responses for forwarding to the validation initiator 140 (e.g. via proxy 120). For example, an OAM packet comprising a plurality of tests for a plurality of SFs 111-117 may also be configured to store such results. In such a case, the validation results aggregator 130 receives an OAM packet that has been processed by SFs 111-117 and forwards that OAM packet with the results toward the validation initiator 140. In another embodiment, the tests transmitted to the SFs 111-117 cause some or all of the SFs 111-117 to individually transmit data to the validation results aggregator 130. In such an embodiment, the validation results aggregator 130 aggregates the test results, performs any appropriate pre-processing and/or data formatting, and forwards a single response to a validation request from a validation initiator 140. In yet another embodiment, the validation results aggregator 130 receives continuous and/or periodic test results from SFs 111-117 and forwards status reports to the validation initiator (e.g. periodically or upon a specified trigger such as a test failure). In yet another embodiment, the validation results aggregator 130 is omitted.

By employing the OAM and/or related mechanisms discussed herein, a validation initiator 140 tests SFs 111-117 to ensure that the SFC comprising the SFs 111-117 is operating properly. The validation initiator 140 employs the validation proxy 120 and/or validation results aggregator 130 to assist in communicating the associated tests, test cases, and/or results to and/from the SFs 111-117. The OAM packet is processed in a manner similar to a data packet, which may allow sequential and/or non-sequential testing of multiple SFs 111-117 spread across multiple OSI layers based on a single request. Such a mechanism supports programmatic testing of virtualized networks to support scalability of network complexity.

Figure 2:
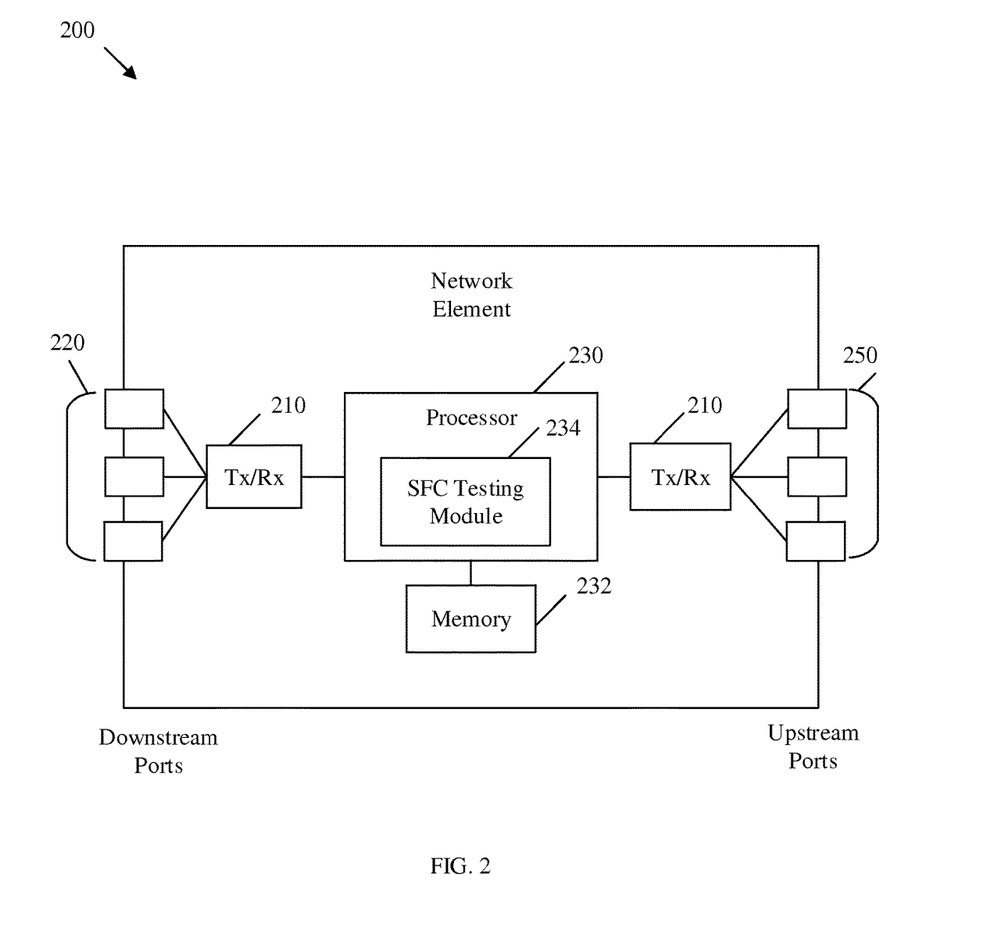
FIG. 2 is a schematic diagram of an embodiment of an NE within a network.

FIG. 2 is a schematic diagram of an embodiment of an NE 200 within a network 100, such as an NE 101, NE 102, and/or NE 103. NE 200 may be any component configured to act as a validation initiator 140, validation proxy 120, validation results aggregator 130, and/or implement SFs 111-117. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports frames through a network, e.g., a switch, router, bridge, server, a client, etc. As shown in FIG. 2, the NE 200 may comprise transceivers (Tx/Rx) 210, which are transmitters, receivers, or combinations thereof. A Tx/Rx 210 is coupled to a plurality of downstream ports 220 (e.g. downstream interfaces) for transmitting and/or receiving frames from other nodes and a Tx/Rx 210 coupled to a plurality of upstream ports 250 (e.g. upstream interfaces) for transmitting and/or receiving frames from other nodes, respectively. A processor 230 is coupled to the Tx/Rxs 210 to process the frames and/or determine which nodes to send frames to. The processor 230 may comprise one or more multi-core processors and/or memory 232 devices, which function as data stores, buffers, Random Access Memory (RAM), Read Only Memory (ROM), etc. Processor 230 may be implemented as a general processor or may be part of one or more application specific integrated circuits (ASICs) and/or digital signal processors (DSPs). Processor 230 comprises a SFC testing module 234, which implements at least some of the methods discussed herein such as initiating OAM validation, building and/or processing OAM packets to test SFs and/or SFCs, and/or aggregating SF/SFC OAM validation results. In an alternative embodiment, the SFC testing module 234 is implemented as instructions stored in memory 232, which are executed by processor 230, or implemented in part in the processor 230 and in part in the memory 232, for example a computer program product stored in a non-transitory memory that comprises instructions that are implemented by the processor 230. In another alternative embodiment, the SFC testing module 234 is implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, SFC testing module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
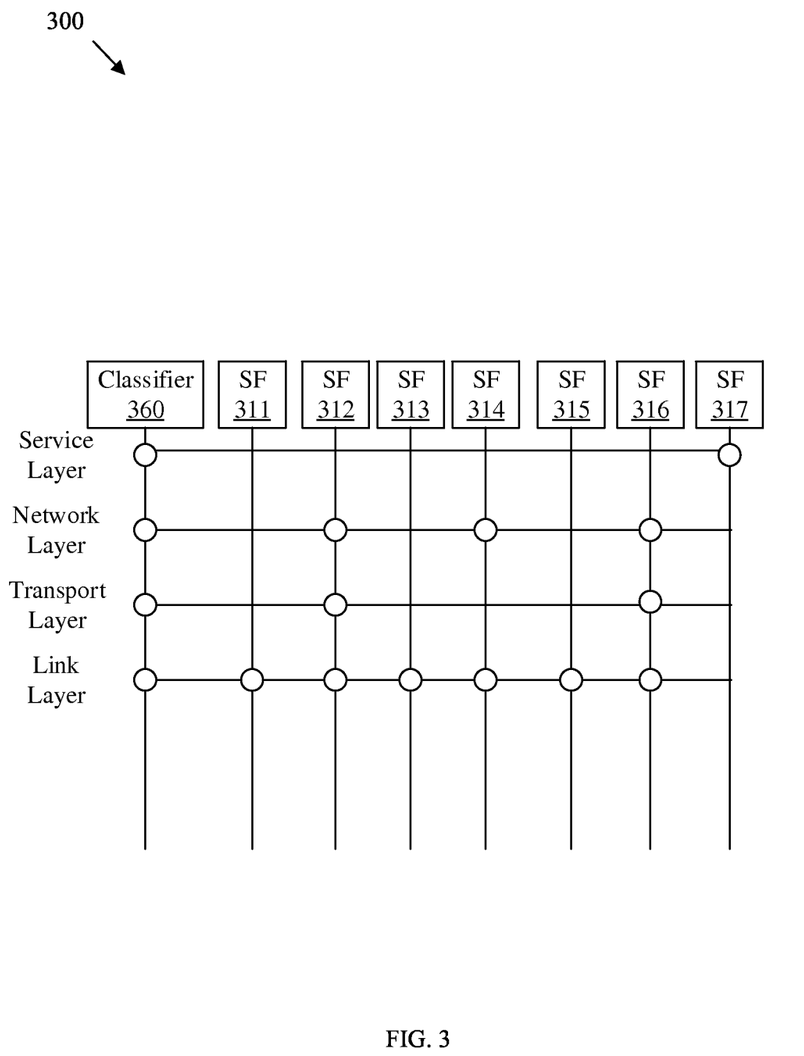
FIG. 3 is a schematic diagram of an embodiment of multi-layer service function chain.

FIG. 3 is a schematic diagram of an embodiment of multi-layer SFC 300. SFC 300 comprise SFs 311, 312, 313, 314, 315, 316, and 317, which may be substantially similar to SFs 111-117, respectively. SFC 300 also comprises a classifier 360. Classifier 360 is an SF that maps a flow to a SFC. As such, classifier 360 is considered part of both SFC 300 and other SFCs operating in a network. Classifier 360 is also treated separately as being distinct from the SFC 300 is some embodiments. As shown in FIG. 3, classifier 360 and SFs 311-317 operate on a service layer, a network layer, a transport layer, and a link layer of the OSI model (e.g. OSI layers 5-2). FIG. 3 indicates each layer of the classifier and SFs 311-317 operate in by a circle positioned on an intersection between a line extending from the function and a line associated with the relevant layer. As shown in FIG. 3, SFC 300 comprises a plurality of SFs that operate on a plurality of layers. Functions that do not operate on a layer may be completely unaware of actions taken on that layer. As such, classifier 360 and SFs 311-317 may not all be aware of each other and may even be unable to directly interpret data generated by functions that operate in different layers. Accordingly, a single layer validation solution is unable to assess the interaction between classifier 360 and SFs 311-317 to verify and/or validate the SFC 300.

Figure 4:
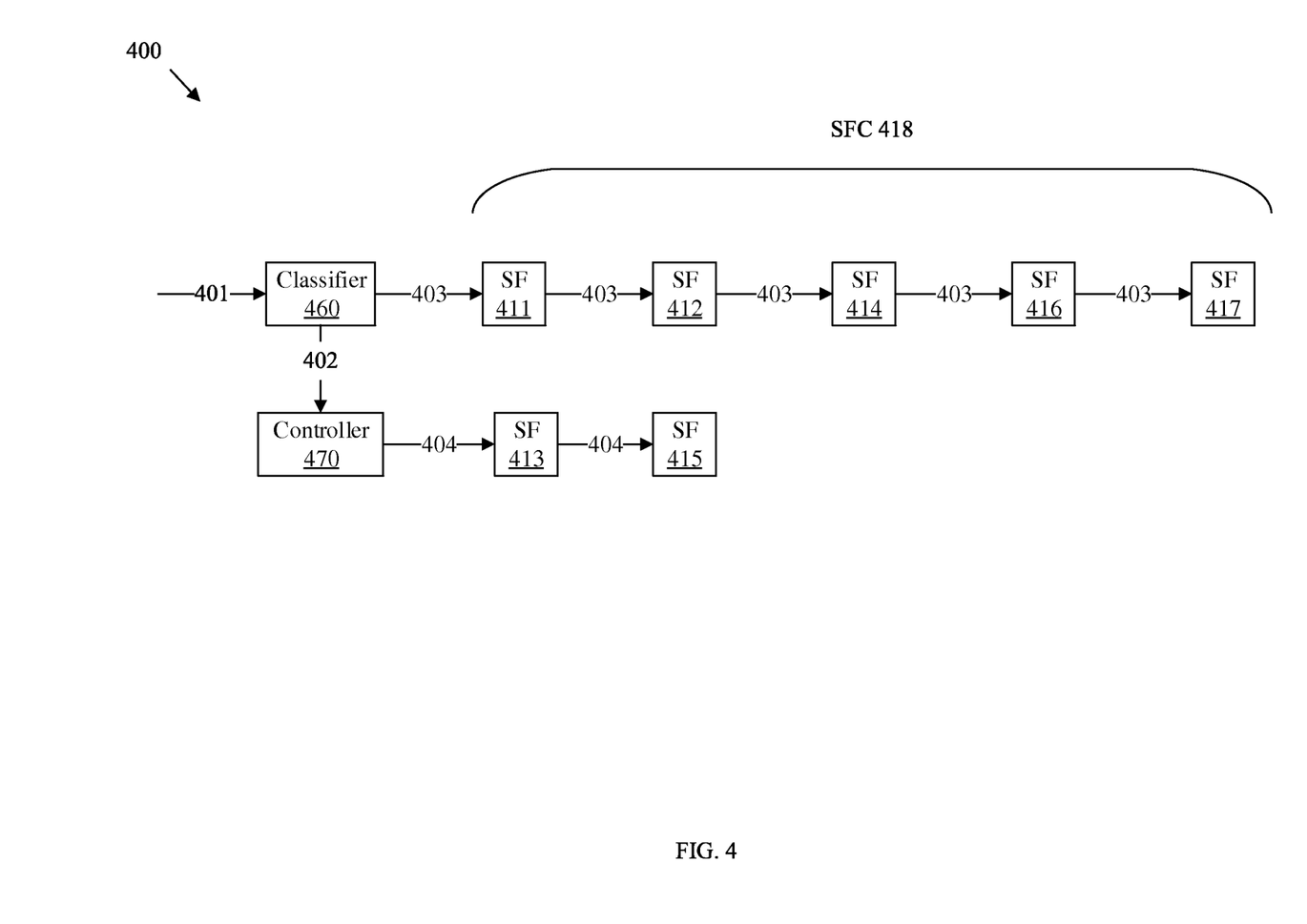
FIG. 4 is a schematic diagram of an embodiment of a service chain validation workflow.

FIG. 4 is a schematic diagram of an embodiment of a service chain validation workflow 400. Workflow 400 comprises a classifier 460, a SFC 418, and SFs 411, 412, 413, 414, 415, 416, and 417, which may be substantially similar to classifier 460, SFC 300, SFs 414-417. Workflow 400 operates via a controller 470 which is an SF configured to control routing and/or port mapping operations of associated network routers and/or switches. For example, controller 470 may be an openflow controller, a path computation element, or other function configured to control a data plane. As shown in FIG. 4, SFs 411-417 all act on a common data flow, but do not directly interact. SFC 418 is validated by a validation request via the mechanisms disclosed herein. For example, the classifier 460 receives a validation request 401 from an initiator. The classifier 460 maps the validation request 401 to the SFC 418 and forwards a validation request 403 to SFs 411-412, 415, and 416-417 for validation/verification. Validation request 403 may be the same request as 401 or may be a different request generated by the classifier 460 in response to request 401. Classifier 460 also transmits a message 402 to controller 470 to cause the controller 470 to transmit a validation request 404 to SF 413 and 415. Message 402 and validation request 404 may or may not be the same request as validation request 401. For example, validation request 401 triggers classifier 460 to signaling in message 402 to controller 470 to cause the controller to transmit validation request 404. In some cases, the classifier 460 and/or controller 470 also act as validation initiators. As shown in workflow 400, a SFC validation scheme is able to validate a SFC 418 even when the SFs 411-417 are not configured to directly interact.

Figure 5:
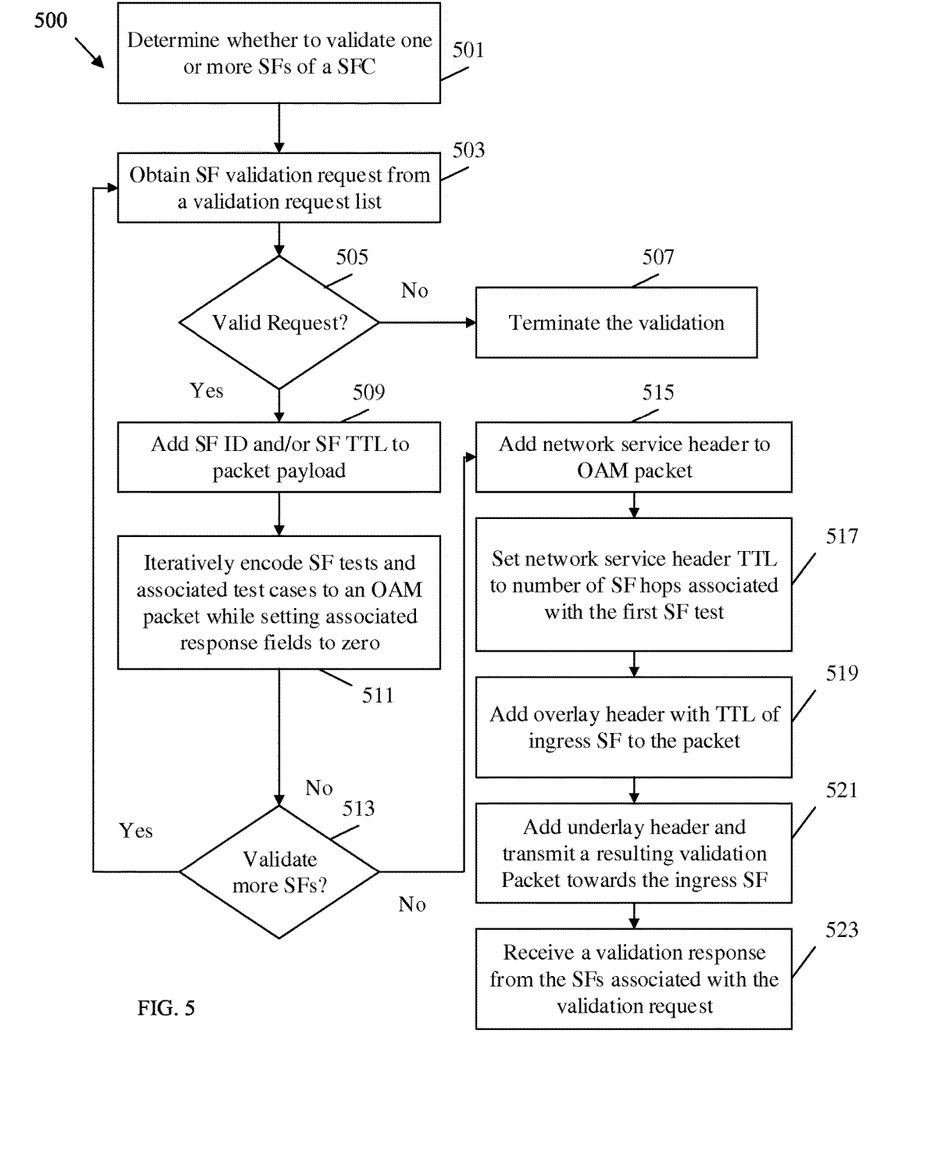
FIG. 5 is a flowchart of an embodiment of a method of a generating a service function chain validation request.

FIG. 5 is a flowchart of an embodiment of a method 500 of a generating a SFC validation request, for example by a validation initiator such as validation initiator 140 and/or NE 200, and/or in response to a request from a validation initiator. At step 501, the method 500 determines whether to validate an SFC, such as SFC 300 and/or 418. The validation of step 501 may apply to all SFs in the SFC or specific SFs in the SFC. At step 503, the method 500 obtains a SF validation request for a specific SF in the SFC from a validation request list. The validation request list may be obtained from a database, network management system, etc. At step 505, the method 500 determines whether the SF validation request is a valid request. If the request is invalid, the method 500 proceeds to step 507 and terminates the validation of method 500. If the request is valid, the method 500 proceeds to step 509 and adds an SF identifier (ID), metadata, and/or a TTL associated with the SF to an OAM packet payload. The TTL is determined based on a number of service hops the associated SF is into the SFC and/or based on a number of service hops between an SF and a previously tested SF. At step 511, SF tests and associated test cases are iteratively encoded into the OAM packet. A response field associated with each test/test case is also set to zero. At step 513, the method 500 determines whether more SFs should be validated by determining whether more SFs are included in the validation request list of step 503. If more SFs should be validated, the method 500 iteratively returns to step 503 until all SFs to be tested have been loaded into the OAM packet. If no more SFs are to be validated, the method proceeds to step 515 and adds a service header to the OAM packet. The network service header comprises a TTL. At step 517, the method 500 sets the network service TTL to a number of SF hops associated with the first SF test in the OAM packet. The network service TTL causes the first SF listed in the OAM packet to process the packet to obtain the associated tests and/or test cases. At step 519, an overlay header is added to the OAM packet with a TTL of an ingress SF. The overlay TTL causes the ingress SF to process the packet and decrement the network service TTL so that the network service TTL is decremented on each service hop and not on each network device hop. At step 521, the method 500 adds an underlay header and/or any other required fields and transmits the packet toward the ingress SF. At step 523, a validation response is received from the SFs associated with the validation request. The validation response may be received from the last SF in the SFC, the last tested SF in the SFC, and/or a validation results aggregator, such as validation results aggregator 130. In an alternative embodiment, a plurality of validation responses are received directly from each tested SF. In yet another alternative embodiment, the network service TTL is instead set to the TTL of an ingress SF. In such a case, each SF in the SFC is required to parse the OAM packet payload, determine whether any test cases are for a local SF, and forward the OAM packet to the next SF in the SFC by obtaining metadata from the OAM packet payload. It should also be noted that the terms ingress/egress SF are employed herein for the purposes of clarity to indicate a first/last SF in an SFC. One of ordinary skill in the art will understand that other terms such as headend/tailend and the like may also be employed to indicate a first/last SF in an SFC and/or an associated network element/node.

Figure 6:
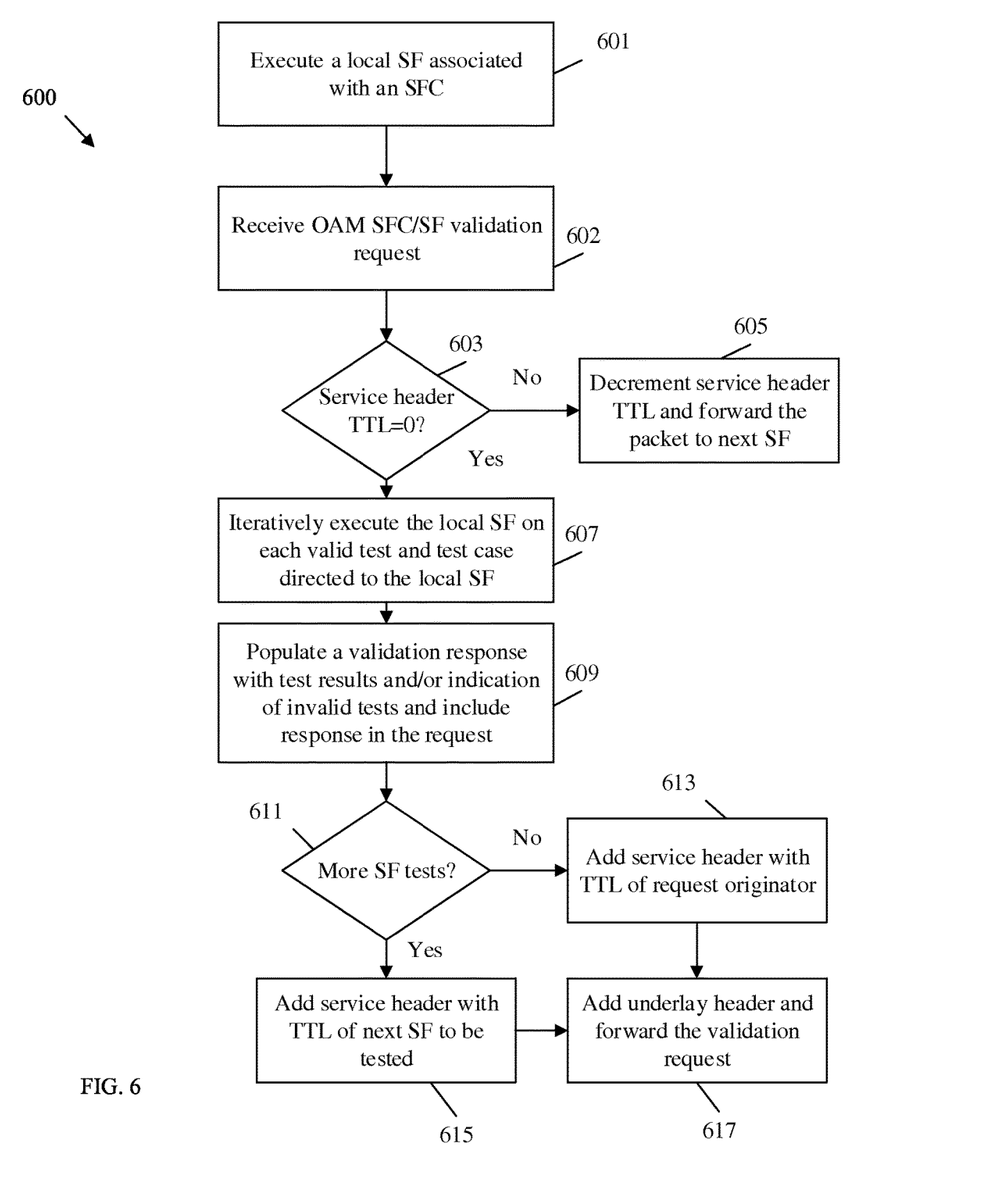
FIG. 6 is a flowchart of an embodiment of a method of a generating a service function chain validation response.

FIG. 6 is a flowchart of an embodiment of a method 600 of a generating a SFC validation response. Method 600 may be implemented by a SFC SF operating on a node, such as SFs 111-117 (e.g. and/or classifier 360, controller 470, etc.) and NEs 101-103 and/or 200, respectively. The method 600 begins at step 601, by executing a local SF associated with the SFC. At step 602, an OAM SFC/SF validation request is received, for example from a validation initiator 140, a validation proxy 120, and/or another SF. An overlay header of the packet comprises a TTL set to zero, which causes the method 600 to process the received packet. At step 603, the method 600 determines if the service header TTL has been reduced to zero. If the service header is not zero, the SF validation tests are intended for another SF. As such, the method 600 proceeds to step 605, decrements the service header TTL, and forward the packet to the next SF in the SFC. If the service header TTL is zero, the method 600 determines that the SF validation tests are intended for the local SF and proceeds to step 607. At step 607, the local SF is executed on each valid test and test case directed to the local SF. At step 609, the validation response is populated with any test results and/or indications of invalid tests in the event that any test/test case cannot be executed. In some embodiments, the response is included in the validation request. At step 611, the method 600 determines whether additional tests for additional SFs are present in the OAM packet. If there are no more tests, the method 600 proceeds to step 613 and adds a service header to the OAM packet with a TTL of an originator of the request. At step 617, the method 600 then adds an underlay header and forwards the request (e.g. toward the originator of the request). If there are more SF tests at step 611, the method 600 proceeds to step 615 and adds a service header with a TTL associated with the next SF in the SFC to be tested. The ID and/or TTL of the next SF is obtained from the payload of the OAM packet. The method 600 then proceeds to step 617 and forwards the validation request, e.g. toward the next SF in the SFC.

Figure 7:
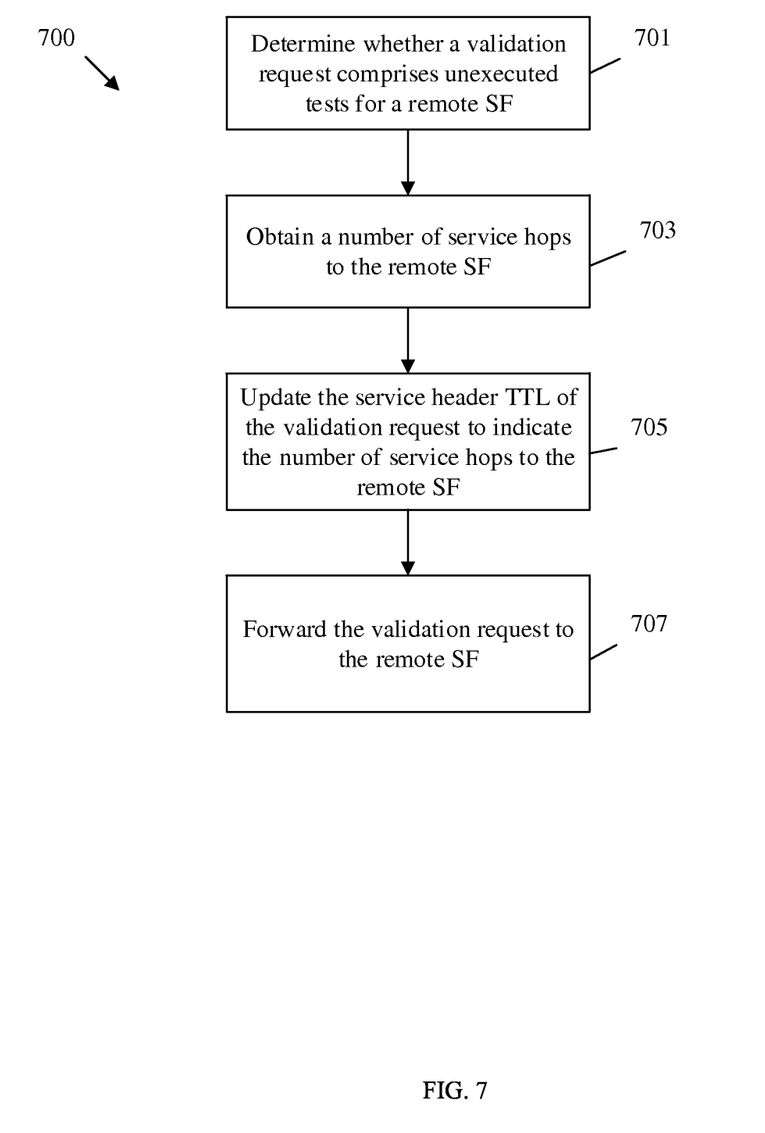
FIG. 7 is a flowchart of an embodiment of a method of forwarding a verification request between service functions.

FIG. 7 is a flowchart of an embodiment of a method 700 of forwarding a verification request between SFs. For example, method 700 may employed to complete steps 611, 615, and 617 of method 600 in some embodiments. At step 701, a local SF that has received a validation request determines whether the validation request comprises unexecuted tests for a remote SF. At step 703, a number of service hops to the remote SF is obtained, for example from the payload of the validation request. At step 705, the service header TTL of the validation request is then updated to indicate the number of service hops to the remote SF. At step 707, the validation request is forwarded to the remote SF.

Figure 8:
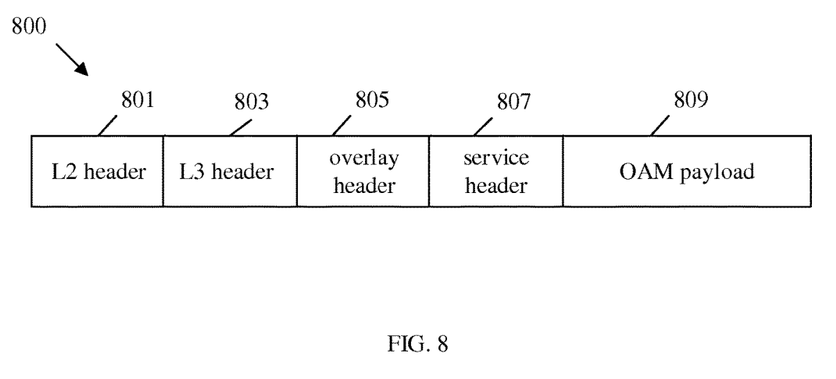
FIG. 8 is a schematic diagram of an embodiment of an OAM packet encoding.

FIG. 8 is a schematic diagram of an embodiment of an OAM packet 800 encoding. OAM packet encoding may be employed to transmit SF tests and/or test cases in methods 500 and/or 600. OAM packet 800 encoding comprises a layer two (L2) header 801, a layer three (L3) header 803, an overlay header 805, a service header 807, and an OAM payload 809. L2 header 801 comprises L2 related address information for NEs implementing SFs, such as source and/or destination MAC addresses. L3 header 803 comprises L3 related address information for NEs implementing SFs, such as source and/or destination IP addresses. Overlay header 805 comprises an overlay TTL. Each NE and/or SF processing the OAM packet 800 decrements the overlay TTL of the overlay header 805 until the overlay TTL reaches zero. Upon reaching zero, the OAM packet is processed by the receiving NE/SF. As such, the overlay header 805 TTL is set based on a number of hops to a first SF, then set to a number of hops to a second SF, etc. to cause the packet to be processed by each SF in the SFC and not processed by other nodes/functions. Service header 807 comprises a network service TTL that is employed to determine a number of service hops to the next SF to be tested, verified, and/or validated as discussed above. OAM payload 809 comprises the testing data and SF identification data employed to test, verify, and/or validate the SFs as well as any test results.

Figure 9:
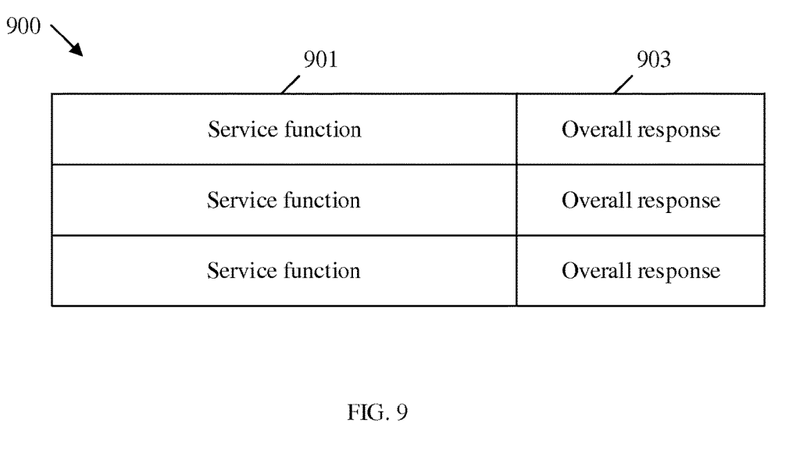
FIG. 9 is a schematic diagram of an embodiment of a service function chain test request encoding.

FIG. 9 is a schematic diagram of an embodiment of a SFC test request 900 encoding. SFC test request 900 may be loaded into an OAM payload of an OAM packet, such as OAM payload 809 of OAM packet 800, respectively. The SFC test request 900 comprises one or more service function fields 901, which are employed to determine the service function(s) to which the SFC test request 900 applies. The SFC test request 900 also comprises one or more overall response fields 903, which are each employed to carry overall results of the tests applied to each SF. SFC test request 900 is employed by a plurality of SFs to determine which tests are requested of each SF and to carry associated overall results.

Figure 10:
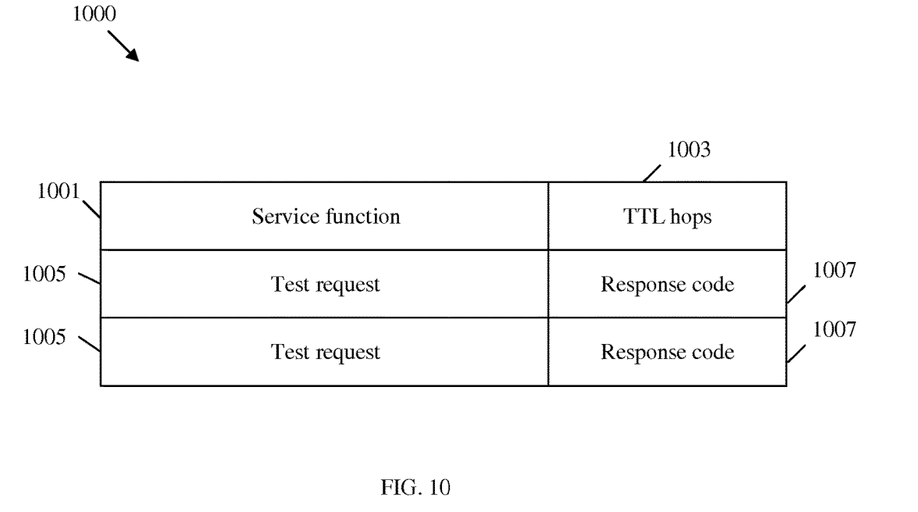
FIG. 10 is a schematic diagram of an embodiment of a service function test request encoding.

FIG. 10 is a schematic diagram of an embodiment of a SF test request 1000 encoding. SF test request 1000 may be carried in a SFC test request 900 encoding. For example, a SF test request 1000 is loaded into a service function field 901 and an associated overall response field 903. The SF test request 1000 comprises a service function field 1001, which comprises a SF ID for an associated SF. The SF test request 1000 further comprises a TTL hops field 1003 which comprises TTL data that is employed to update a service header 807 to locate the associated SF as discussed in methods 500, 600, and 700. SF test request 1000 also comprises one or more test request fields 1005, which each indicate to an associated test which is to be conducted by the SF in the service function field 1001 to verify/validate the SF. SF test request 1000 further comprises response code fields 1007, which are employed to carry the results of the associated tests indicated in the test request fields 1005. SF test request 1000 are employed by an SF to determine all tests relevant to the SF and to carry any results, such as pass, fail, invalid test, a specific outcome, etc.

Figure 11:
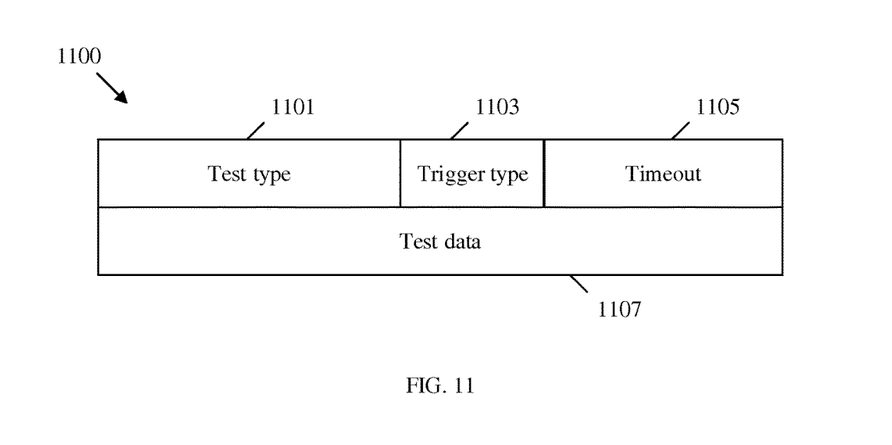
FIG. 11 is a schematic diagram of an embodiment of a test request encoding.

FIG. 11 is a schematic diagram of an embodiment of a test request 1100 encoding. Test request 1100 is carried in a test request field such as test request fields 1005. Test request 1100 comprises a test type field 1101, a trigger type field 1103, a timeout field 1105, and a test data field 1107. The test type field 1101 is employed to indicate a type of test to be executed by an SF. The trigger type field 1103 is employed to indicate a trigger to cause the test to be implemented. For example, the trigger may be set to on receipt, continuously/periodically, on the occurrence of a triggering event, etc. The timeout field 1105 indicates a maximum duration for an associated test. The test data 1107 is employed to indicate all test cases and/or associated data relevant to the associated test. Test request 1100 is employed by an SF to determine the requested test to be performed and the timing associated with such a test.

As discussed herein above, service function chaining enables the creation of composite services that comprise an ordered set of service functions that may be applied to packets and/or frames selected as a result of classification (e.g. to a particular flow). SFC is a concept that provides for more than just the application of an ordered set of SFs to selected traffic. Rather, an SFC employs a mechanism for deploying SFs in a way that enables dynamic ordering and topological independence of those SFs as well as the exchange of metadata between participating entities. The present disclosure provides an architectural framework for SFC OAM.

Multiple layers may come into play for implementing an SFC as discussed in FIG. 3 herein above. Such layers include the service layer and the underlying network layer, transport layer, and link layers. The service layer comprises classifiers and service functions, and employs the overlay network to reach from a classifier to service functions and between service functions. The network overlay transport layer extends in between the various service functions and is mostly transparent to the service functions. The network overlay transport layer leverages various overlay network technologies to interconnect the service functions and allow establishing of service function paths. The link layer is dependent upon the physical technology used and may comprise Ethernet, SONET (Synchronous Optical Networking) systems such as Packet over SONET (POS), Dense Wavelength Division Multiplexing (DWDM), etc.

The SFC may operate at the service layer. For the purpose of defining the OAM framework, the service layer is broken up into a service function component, a service function chain component, and a classifier component. The service function component comprises a function that provides a specific service. OAM solutions for the service function component are employed to test the service functions from any SFC aware network devices, such as classifiers, controllers, and/or other service nodes. The service function chain component comprises an ordered set of service functions. An OAM solution for the service function chain component is employed to test the service function chains and the service function paths. The classifier component comprises a policy that describes a mapping from flows to service function chains. An OAM solution for the classifier component tests the validity of the classifiers. FIG. 3 depicts an example where OAM for the three defined components is used within the SFC environment.

Multiple SFC OAM solutions may be defined, many of which may target a specific component of the service layer. Such, SFC OAM solutions provide coverage of the SFC OAM components (e.g. the service function component, the service function chain component and the classifier component).

One SFC OAM requirement for the service function component is to allow an SFC aware network device to check the availability to a specific service function, located on the same or different network devices. A determination that a service function is available is made based on multiple criteria. For example, a service function is considered sufficiently available if a service node (e.g. physical or virtual) hosting a service function is available and is functional. As another example, a service function is only considered available when a packet, after passing through the service function, is examined and validated to determine that expected service was applied to the packet.

The former approach may not provide sufficient confidence of actual service function availability (e.g. a service node and a service function may act as two different entities). The latter approach may be capable of providing an extensive verification, but may result in some network costs. For example, some service functions make direct modifications to packets, while other service functions may not make any modifications to packets. Additionally, some service functions conditionally drop packets intentionally. In such case, packets may not be returned from the service function. There are many flavors of service functions available, with many more being continuously introduced. Even a given service function may introduce a new functionality within a service function chain (e.g. a new signature in a firewall). One cost of the latter approach is that a verifier function may be continuously modified to keep up with newly introduced services and lack extendibility. The framework disclosed herein discloses an architectural model with a generalized approach to verify that a service function is sufficiently available to support extendibility.

A second SFC OAM use for the service function component is to allow an SFC aware network device to check a loss and delay of a specific service function located on the same or different network devices. Verifying an SFC is a complicated process as the SFC may comprise varying SFs. Thus, the SFC employs the OAM layer to perform validation and verification of SFs within an SFC Path as well as connectivity and fault isolation.

In order to perform service connectivity verification of an SFC, the OAM may be initiated from any SFC aware network device for end-to-end path or partial paths terminating on a specific SF within the SFC. The OAM function ensures the SFs chained together have connectivity as intended when the SFC was established. A return code is sent back in a response to the OAM packet in order to qualify the verification. When Equal Cost Multipath routing (ECMP) exists at the service layer on a given SFC, there is an ability to discover and traverse all available paths.

The ingress of a service function chain or an SFC aware network device has an ability to perform loss and delay measurements over the service function chain as a unit (e.g. end-to-end) or to a specific service function through the SFC. A classifier defines a flow and maps incoming traffic to a specific SFC. Accordingly, proper functionality may require that the classifier is correctly defined and functioning. The SFC OAM tests the definition of flows and mapping functionality to expected SFCs.

Various SFC OAM capabilities result in a need for various OAM functions at different layers, which requires enhancement of such OAM functions to support SFC and SFs that may operate a single SF to multiple SFs in an SFC and/or to verify multiple SFCs. For example, connectivity is an on-demand function to verify that connectivity exists between network elements and to verify that availability exists to service functions. Ping is a tool used to verify connectivity. OAM messages may be encapsulated with an SFC header and OAM markings when testing such a service function chain component. OAM messages are encapsulated with an SFC header and with OAM markings when testing a service function component. An OAM function performed by a connectivity function includes verification of the maximum transmission unit (MTU) size from a source to the destination SF or through the SFC, which may require an ability for an OAM packet to accept a variable length packet size. Other examples of connectivity function verification also include verifying packet re-ordering and corruption, verifying a policy of an SFC or SF using an OAM packet, verifying and validating forwarding paths, and proactively testing alternate or protected paths to support reliability of network configurations.

Continuity is a model where OAM messages are sent periodically to validate or verify the reachability to a given SF or through a given SFC. Continuity allows monitoring network device to quickly detect failures like link failures, network failures, service function outages or service function chain outages. Bidirectional forwarding detection (BFD) is an example function which detects failures quickly. OAM functions that support continuity checking have the ability to provision continuity checking to a given SF or through a given SFC and are capable of notifying of failure upon failure detection to allow other OAM functions to take appropriate corrective action.

Tracing is an example OAM function that allows an operation to trigger an action (e.g. a response generation) from every transit device on a tested layer. Tracing is employed to gather information from every transit device or to isolate a failure point towards an SF or through an SFC. OAM functions that are supported by trace functions have an ability to trigger an action from every transit device on a tested layer towards an SF or through an SFC using TTL or other mechanisms. Such functions further comprise an ability to trigger every transit device to generate a response with one or more OAM codes on a tested layer towards an SF or through an SFC, using TTL or other mechanisms. Such functions also comprise an ability to discover and traverse ECMP paths within an SFC and/or to skip un-supported SFs while tracing SFs in an SFC.

Performance management functions involve measuring of packet loss, delay, delay variance, etc. Such measurements are measured pro-actively and/or on-demand. An SFC OAM framework provides an ability to measure packet loss for an SFC. In an SFC, various SFs are chained together. Using an on-demand function, packet loss is measured using statistical mechanisms. Using OAM packets, an approximation of packet loss for a given SFC is measured. Further, delay within an SFC is measured based on the time it takes for a packet to traverse the SFC from an ingress SF to an egress SF. As the SFCs is unidirectional in nature, measurement of one-way delay is useful. In order to measure one-way delay, associated clocks are synchronized using network time protocol (NTP), global positioning systems (GPS), etc. Delay variance is also measured by sending OAM packets and measuring jitter between the packets passing through the SFC. Some of the OAM functions supported by performance management functions comprise an ability to measure a packet processing delay of a service function or a service function path along an SFC and/or an ability to measure a packet loss of a service function or a service function path along an SFC.

Various OAM functions are available at different levels. Various gaps within the OAM toolset may exist to support OAM functions on an SFC. For example, there are various OAM tool sets available to perform OAM functions in the network layer, protocol layers, and link layers. These OAM functions validate some of the network overlay transport. For example, ping and trace perform connectivity checking and tracing for intermediate hops in a network. Such tools support different network types like IP, multi-protocol label switching (MPLS), transparent interconnect for lots of links (TRILL), etc. The OAM tool set is also be extended to provide connectivity and continuity checks within overlay networks. BFD also performs detection of data forwarding failures. Other tools also include network overlay (N/W Overlay), network virtualization over layer three (NVo3), and IP performance metrics (IPPM).

TABLE 1

| Layer | Connectivity | Continuity | Trace | Performance |
|---|---|---|---|---|
| N/W Overlay | Ping | BFD, NVo3 | Trace | IPPM |
| SF | None | None | None | None |
| SFC | None | None | None | None |

As shown above, OAM functions for SFC are not standardized. Hence, there are no standard based tools available to verify SF and SFC. Primary OAM functions exist for network, transport, link, and other layers. Tools like ping, trace, BFD, etc., perform such OAM functions. Configuration, orchestration, and manageability of SF and SFC may be performed using command line interface (CLI), network configuration protocol (Netconf), etc. For configuration, manageability, and orchestration, providing data and information models for SFC is useful. With virtualized SF and SFC, manageability of such functions may be performed programmatically. SFC and SF OAM further provides mechanisms for preventing usage of OAM channel for distributed denial of service (DDOS) attacks, preventing OAM packets meant for a given SFC from becoming leaked beyond that SFC, and preventing OAM packets from leaking the information of an SFC beyond its administrative domain.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in a network element, the method comprising:
    identifying a service function (SF) for validation, the SF being associated with a service function chain (SFC), and wherein the SF is operating on a network node and is being applied to a data flow;
    encoding one or more tests associated with the SF in a payload of an operations, administration, and management (OAM) packet;
    setting a response field associated with the one or more tests in the OAM packet;
    setting an overlay header time to live (TTL) field in the OAM packet to a number of network hops to a service node hosting an ingress SF of the SFC, wherein the overlay header TTL is decremented on each network hop;
    setting a network service header TTL to a number of SF hops from the ingress SF to the SF in the SFC, wherein the network service header TTL is decremented on each service hop in the SFC; and
    transmitting a validation request comprising the OAM packet towards the SF to request validation of the SF by execution of the tests.

2. The method of claim 1, further comprising validating the entire SFC, wherein the SFC comprises a plurality of SFs, including the SF, each of the plurality of SFs being applied to the data flow, and wherein the tests encoded in the OAM packet further comprise the tests for each of the SFC SFs.

3. The method of claim 2, wherein at least two of the plurality of SFs operate on different layers of the Open Systems Interconnect (OSI) model.

4. The method of claim 2, wherein validating the SF is made in response to a request from a network management system, a path head end node, a source associated with the data flow in another network domain, or combinations thereof.

5. The method of claim 1, wherein the validation request is transmitted toward the SF via a proxy.

6. The method of claim 1, further comprising encoding SF identifiers (IDs) or SF metadata in the OAM packet to identify associations between the SFs and the tests.

7. The method of claim 1, further comprising receiving a validation response from a headend network element associated with the SF, wherein the validation response indicates results of the tests.

8. The method of claim 7, wherein the tests are associated with a plurality of SFs in the SFC, including the SF, wherein the validation response is received via a validation results aggregator, and wherein the validation response results of the tests include results from each of the SFs.

9. The method of claim 1, wherein each of the tests are encoded in a test request encoding comprising a test type field indicating the associated test, a trigger type field indicating a trigger for the associated test, a timeout for the associated test, and test data for the associated test.

10. A network node comprising:
a transmitter;
a receiver; and
a processor coupled to the transmitter and the receiver and configured to cause the network node to:
execute a local service function (SF) associated with a service function chain (SFC), wherein executing the local SF comprises performing an operation on all messages associated with a data flow;
receive, via the receiver, a validation request comprising an operations, administration, and management (OAM) packet requesting validation of a plurality of service functions associated with the SFC, wherein the OAM packet comprises a plurality of tests in a payload, a response field for each of the plurality of tests, a first time to live (TTL) indicating a number of network hops to a service node hosting an ingress SF of the SFC, and a second TTL indicating a number of SF hops to the local SF in the SFC;
execute the local SF on each test directed to the local SF; and
populate the response field with results associated with each test directed to the local SF.

11. The network node of claim 10, wherein the transmitter is configured to forward the validation request to a second network node operating a remote SF associated with the SFC for validation of the remote SF.

12. The network node of claim 10, wherein the processor is further configured to determine at least one of the tests is directed to the local SF when the second TTL is set to zero.

13. The network node of claim 12, wherein the processor is further configured to:
determine the validation request comprises unexecuted tests directed to a remote SF;
obtain a number of service hops to the remote SF;
update the second TTL field of the validation request to indicate the number of service hops to the remote SF; and
forward the validation request toward the remote SF via the transmitter.

14. The network node of claim 10, wherein the validation request comprises an OAM payload field, and wherein the OAM payload field comprises an indication of each SF to be validated and an overall response field indicating overall results of the tests associated with each SF.

15. A method comprising:
encapsulating a payload of an operations, administration, and management (OAM) message with a service function chain (SFC) header for testing a SFC component, wherein the SFC component comprises an ordered set of service functions (SFs) forming an SFC, and wherein the payload contains a set of tests associated with the SFs, a response field for each test in the set of tests, a first time to live (TTL) indicating a number of network hops to a service node hosting an ingress SF of the SFC, and a second TTL indicating a number of SF hops to the local SF in the SFC; and
transmitting the OAM message toward a network element implementing at least a portion of the SFC component to validate a policy of the SFC component.

16. The method of claim 15, wherein the OAM message is transmitted periodically to validate reachability of a service function (SF) in the SFC component to provision a continuity check of the SF or the SFC and notify of failure upon failure detection.

17. The method of claim 15, wherein the OAM message is transmitted as part of a tracing function triggering an action from every transit device associated with the SFC using a TTL function.

* * * * *